United States Patent
Peng et al.

(10) Patent No.: US 11,346,459 B1
(45) Date of Patent: May 31, 2022

(54) INDUCTIVE SWITCHING VALVE

(71) Applicant: Harda Intelligent Technologies Co., Ltd., Xiamen (CN)

(72) Inventors: Kesheng Peng, Xiamen (CN); Yulin Qiu, Xiamen (CN)

(73) Assignee: HARDA INTELLIGENT TECHNOLOGIES CO., LTD., Xiamen (CN)

( * ) Notice: Subject to any disclaimer, the term of this patent is extended or adjusted under 35 U.S.C. 154(b) by 0 days.

(21) Appl. No.: 17/160,333

(22) Filed: Jan. 27, 2021

(51) Int. Cl.
F16K 31/06 (2006.01)
F16K 37/00 (2006.01)
F16K 11/078 (2006.01)

(52) U.S. Cl.
CPC ...... F16K 31/0617 (2013.01); F16K 11/0787 (2013.01); F16K 37/0033 (2013.01)

(58) Field of Classification Search
CPC .............................. F16K 1/0617; F16K 37/033
See application file for complete search history.

(56) References Cited

U.S. PATENT DOCUMENTS

| | | | | |
|---|---|---|---|---|
| 5,983,918 | A * | 11/1999 | Chang | G05D 23/1313 137/98 |
| 6,257,493 | B1 * | 7/2001 | Chamot | F16K 19/006 236/12.13 |
| 7,134,452 | B2 * | 11/2006 | Hiroshi | F16K 11/0787 251/117 |
| 7,845,574 | B2 * | 12/2010 | Mace | F16K 11/0787 236/12.21 |
| 10,247,316 | B2 * | 4/2019 | Leinen | G05D 23/1313 |
| 10,794,234 | B1 * | 10/2020 | Kim | F01L 1/2411 |
| 2019/0316496 | A1 * | 10/2019 | Zhang | F02D 41/009 |

* cited by examiner

*Primary Examiner* — Kevin R Barss
(74) *Attorney, Agent, or Firm* — Leong C. Lei

(57) ABSTRACT

An inductive switching valve includes a valve body, a valve core assembly that is mounted in the valve body, a rocker arm that is movably connected to the valve body and matched with the valve core assembly, and a switching feedback unit. A magnetic assembly and a magnetic sensor of the switching feedback assembly are mounted to the rocker arm and the valve body, respectively. The switching feedback unit can automatically generate a corresponding switching signal according to the switching state of the inductive switching valve, so that the present invention can automatically feed back the switching state of the inductive switching valve.

12 Claims, 7 Drawing Sheets

INDUCTIVE SWITCHING VALVE

BACKGROUND OF THE INVENTION

1. Field of the Invention

The present invention relates to a valve, and more particularly to an inductive switching valve.

2. Description of the Prior Art

A faucet is generally equipped with a mechanical switching valve to realize the adjustment and control of the output water flow and the water temperature. But, the conventional mechanical switching valve cannot automatically feed back its switching status. People hope that the mechanical switching valve can automatically feed back its switching status so as to facilitate the control of a solenoid valve, a water pump and a luminous member that are in cooperation with the faucet, so as to increase the use experience of the faucet.

SUMMARY OF THE INVENTION

In view of the defects of the prior art, the primary object of the present invention is to provide an inductive switching valve that can automatically feed back its switching status In order to achieve the above object, the present invention adopts the following technical solutions:

An inductive switching valve comprises a valve body, a valve core assembly, a rocker arm, and a switching feedback unit. The valve core assembly is mounted in the valve body. The rocker arm is movably connected to the valve body. The rocker arm is matched with the valve core assembly. The rocker arm is movable between an open position and a closed position so that the valve core assembly controls the inductive switching valve to switch a switching state. The rocker arm is rotatable between a cold water position and a hot water position for the valve core assembly to control an output water temperature of the inductive switching valve. The switching feedback unit includes a magnetic assembly with magnetism and a magnetic sensor for sensing a magnetic field of the magnetic assembly. One of the magnetic assembly and the magnetic sensor is mounted to the valve body. The other of the magnetic assembly and the magnetic sensor is mounted to the rocker arm.

In an embodiment of the present invention, the magnetic assembly includes a magnetic post holder and at least three magnetic posts fitted to the magnetic post holder. The magnetic post holder is fixed to the rocker arm. The magnetic posts are arranged in an arc on the magnetic post holder. The magnetic posts surround the rocker arm. The magnetic sensor is mounted to the valve body.

In an embodiment of the present invention, the magnetic assembly includes a magnetic block holder and an arc-shaped magnetic block fitted onto the magnetic block holder. The magnetic block holder is fixed to the rocker arm. The arc-shaped magnetic block surrounds the rocker arm. The magnetic sensor is mounted to the valve body.

Preferably, the valve body is formed with a mounting groove, and the magnetic sensor is detachably fitted into the mounting groove.

In an embodiment of the present invention, the magnetic assembly includes at least three magnetic posts. The magnetic posts are arranged in an arc and fitted onto a top of the valve body, and the magnetic posts surround a center of the top of the valve body. The rocker arm passes through the center of the top of the valve body. The magnetic sensor is mounted to the rocker arm.

In an embodiment of the present invention, the magnetic assembly includes an arc-shaped magnetic block. The arc-shaped magnetic block is fitted onto a top of the valve body, and the arc-shaped magnetic block surrounds a center of the top of the valve body. The rocker arm passes through the center of the top of the valve body. The magnetic sensor is mounted to the rocker arm.

Preferably, the magnetic sensor is connected to the rocker arm through a magnetic sensor holder. The magnetic sensor holder is connected to the rocker arm, and the magnetic sensor holder is formed with an engaging groove. The magnetic sensor is detachably fitted into the engaging groove.

Preferably, a top and a bottom of the valve body are formed with a through hole and a mounting hole to communicate with a valve body inner cavity, respectively. The mounting hole at the bottom of the valve body is fitted with a fixing seat. The fixing seat is formed with a cold water inlet, a hot water inlet and a mixed water outlet. The valve core assembly includes a rotating seat, a connecting plate, a movable ceramic plate and an immovable ceramic plate that are sequentially arranged in the valve body inner cavity in a top-down direction. The immovable ceramic plate is formed with a cold water hole, a hot water hole and a mixed water hole that are in communication with the cold water inlet, the hot water inlet and the mixed water outlet, respectively. The movable ceramic plate is slidably connected to the immovable ceramic plate. A bottom of the movable ceramic plate is formed with a water mixing groove. The water mixing groove movably communicates with the cold water hole, the hot water hole and the mixed water hole. The connecting plate is connected to the movable ceramic plate to be moved synchronously. The connecting plate is formed with a connecting hole. The rotating seat is rotatable in the valve body inner cavity. The rotating seat is formed with a mounting channel passing through the rotating seat. The rocker arm passes through the mounting channel. An upper end of the rocker arm extends out of the valve body through the through hole. A lower end of the rocker arm is inserted into the connecting hole of the connecting plate. A middle section of the rocker arm is hingedly connected to the rotating seat through a pin.

Preferably, a valve body limiting block is provided in the valve body inner cavity of the valve body. Two rotation limiting blocks are provided on a side wall of the rotating seat of the valve core assembly. The two rotation limiting blocks movably contact with two sides of the valve body limiting block.

Preferably, the magnetic sensor is one of a Hall switch and a reed switch.

By adopting the aforementioned technical solutions, one of the magnetic assembly and the magnetic sensor is mounted to the valve body, and the other of the magnetic assembly and the magnetic sensor is mounted to the rocker arm. In this way, when the rocker arm is moved between the open position and the closed position to control the inductive switching valve of the present invention to switch the switching state, the distance between the magnetic assembly and the magnetic sensor will change accordingly along with the movement of the rocker arm, so that the magnetic field intensity of the magnetic assembly sensed by the magnetic sensor changes and the signal output by the magnetic sensor automatically changes accordingly. Thus, the magnetic sensor can automatically generate a corresponding switching signal according to the switching state of the inductive switching valve of the present invention. Therefore, the switching state of the inductive switching valve of the present invention can be learned through the switching signal generated by the magnetic sensor, so that the present invention can automatically feed back the switching state of the inductive switching valve.

DETAILED DESCRIPTION OF THE PREFERRED EMBODIMENTS

Figure 1:
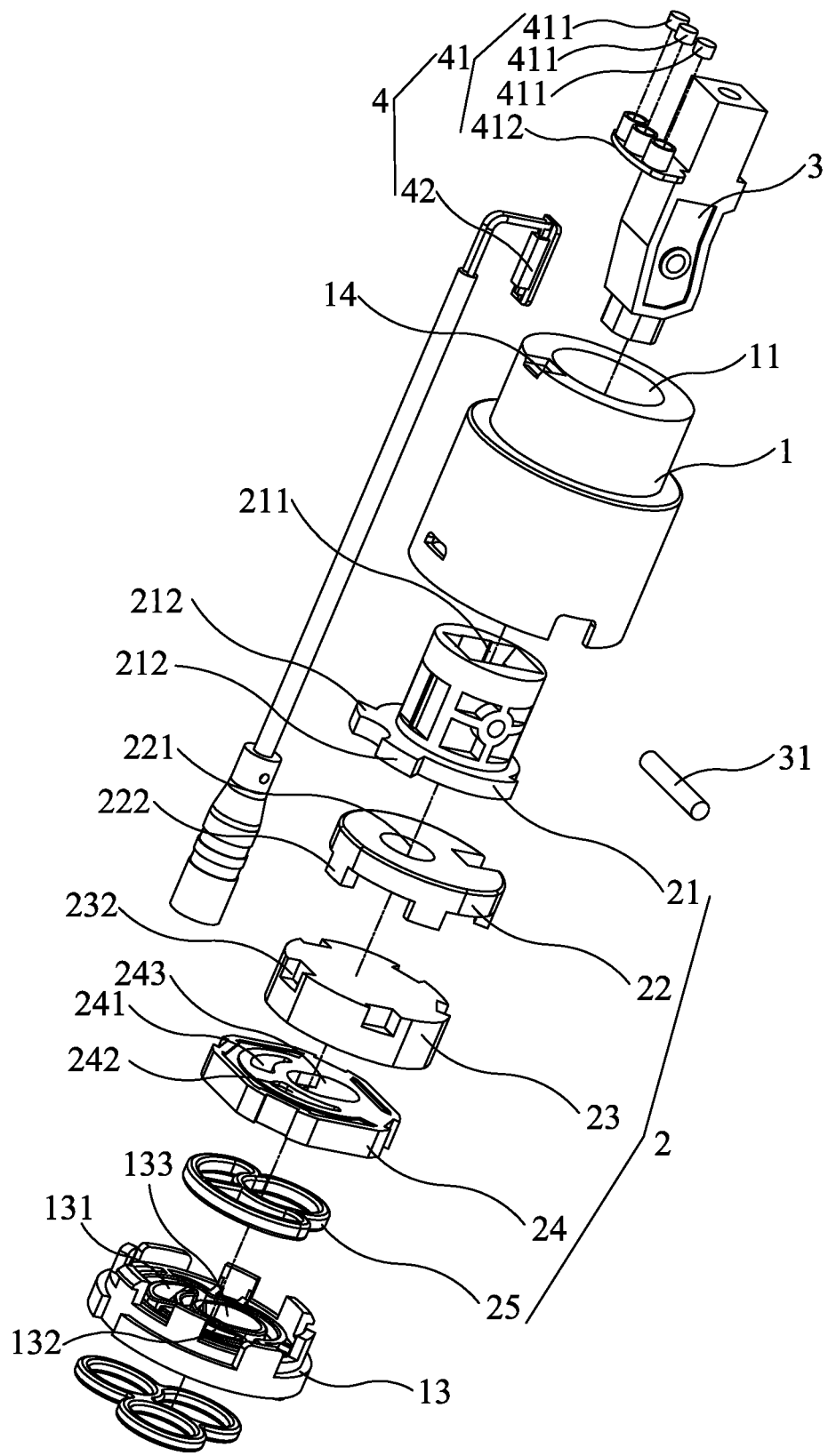
FIG. 1 is an exploded view according to a first embodiment of the present invention.
Figure 2:
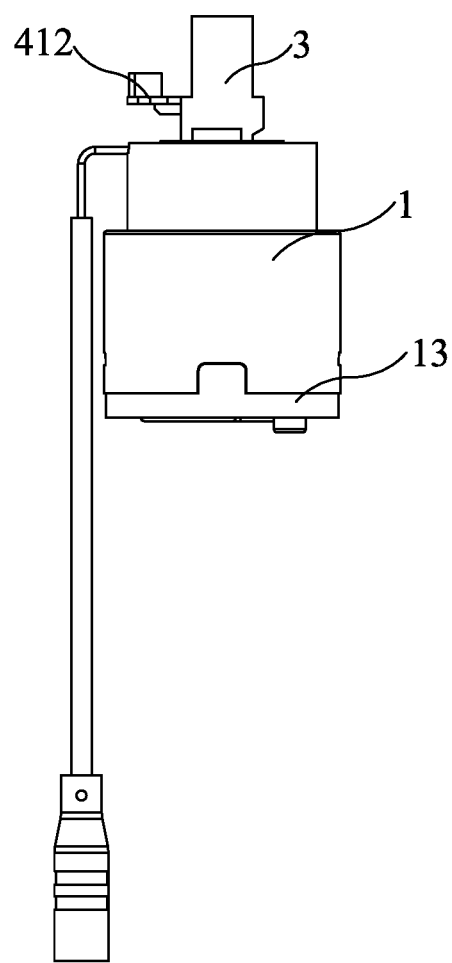
FIG. 2 is a schematic view according to the first embodiment of the present invention.

Embodiments of the present invention will now be described, by way of example only, with reference to the accompanying drawings.

As shown in FIG. 1 through FIG. 7, the present invention discloses an inductive switching valve, comprising a valve body 1, a valve core assembly 2, a rocker arm 3, and a switching feedback unit 4. The valve core assembly 2 is mounted in the valve body 1. The rocker arm 3 is movably connected to the valve body 1, and the rocker arm 3 is matched with the valve core assembly 2. The rocker arm 3 can be moved between an open position and a closed position so that the valve core assembly 2 controls the inductive switching valve to switch a switching state. The rocker arm 3 can be rotated between a cold water position and a hot water position for the valve core assembly 2 to control the output water temperature of the inductive switching valve. The switching feedback unit 4 includes a magnetic assembly 41 with magnetism and a magnetic sensor 42 for sensing the magnetic field of the magnetic assembly 41. The magnetic sensor 42 may be a Hall switch or a reed switch. One of the magnetic assembly 41 and the magnetic sensor 42 is mounted to the valve body 1, and the other of the magnetic assembly 41 and the magnetic sensor 42 is mounted to the rocker arm 3.

The present invention can automatically feed back the switching state of the inductive switching valve of the present invention through the switching feedback unit 4. Specifically, one of the magnetic assembly 41 and the magnetic sensor 42 is mounted to the valve body 1, and the other of the magnetic assembly 41 and the magnetic sensor 42 is mounted to the rocker arm 3. In this way, when the rocker arm 3 is moved between the open position and the closed position to control the inductive switching valve of the present invention to switch the switching state, the distance between the magnetic assembly 41 and the magnetic sensor 42 will change accordingly along with the movement of the rocker arm 3, so that the magnetic field intensity of the magnetic assembly 41 sensed by the magnetic sensor 42 changes and the signal output by the magnetic sensor 42 automatically changes accordingly. Thus, the magnetic sensor 42 can automatically generate a corresponding switching signal according to the switching state of the inductive switching valve of the present invention. Therefore, the switching state of the inductive switching valve of the present invention can be learned through the switching signal generated by the magnetic sensor 42, so that the present invention can automatically feed back the switching state of the inductive switching valve.

In order to further explain the technical solution of the present invention, the present invention will be described in detail below through specific embodiments.

Embodiment 1

Figure 3:
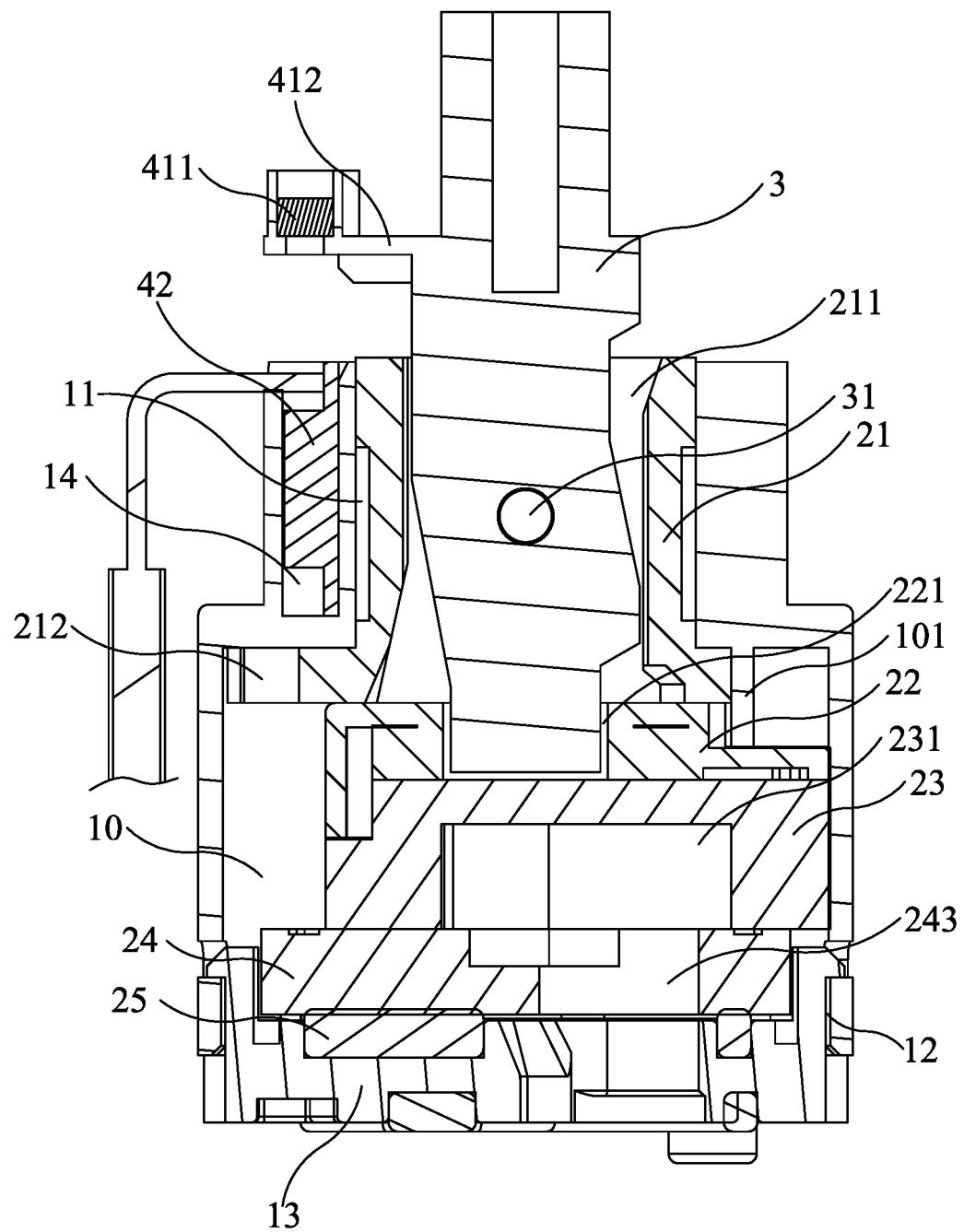
FIG. 3 is a cross-sectional view according to the first embodiment of the present invention, wherein the rocker arm is in a closed position.
Figure 4:
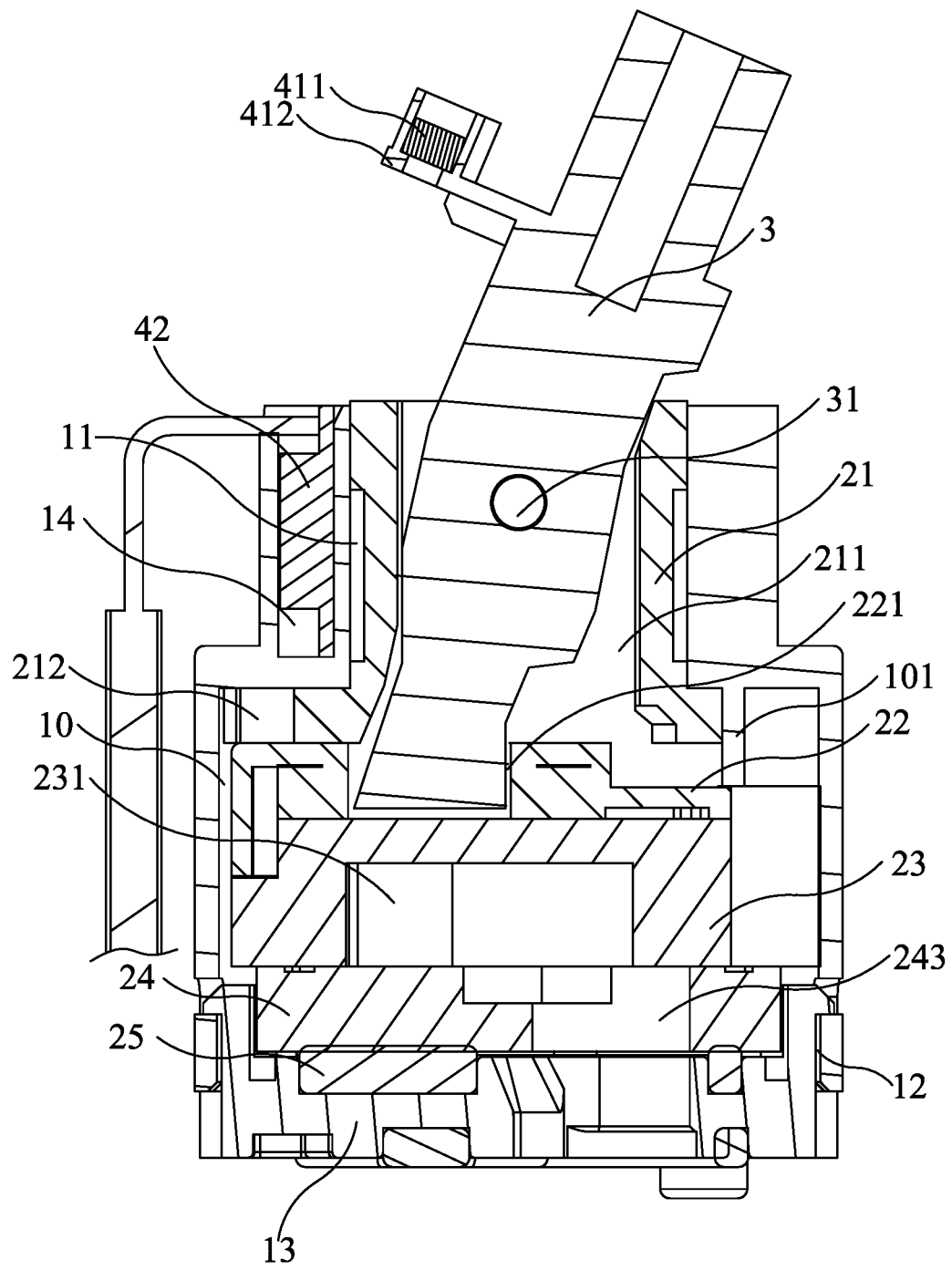
FIG. 4 is a cross-sectional view according to the first embodiment of the present invention, wherein the rocker arm is in an open position.

As shown in FIG. 1, FIG. 3 and FIG. 4, in the first embodiment of the present invention, the top and the bottom of the valve body 1 are formed with a through hole 11 and a mounting hole 12 to communicate with a valve body inner cavity 10, respectively. The mounting hole 12 at the bottom of the valve body 1 is fitted with a fixing seat 13. The fixing seat 13 can be fitted with the mounting hole 12 by a snap-fit connection or threaded connection. The fixing seat 13 is formed with a cold water inlet 131, a hot water inlet 132 and a mixed water outlet 133. The cold water inlet 131 and the hot water inlet 132 are configured to input cold and hot water, and the mixed water outlet 133 is configured to output mixed water.

As shown in FIG. 1, FIG. 3 and FIG. 4, in the first embodiment of the present invention, the valve core assembly 2 includes a rotating seat 21, a connecting plate 22, a movable ceramic plate 23 and an immovable ceramic plate 24 that are sequentially arranged in the valve body inner cavity 10 in a top-down direction. The immovable ceramic plate 24 is formed with a cold water hole 241, a hot water hole 242 and a mixed water hole 243 that are in communication with the cold water inlet 131, the hot water inlet 132 and the mixed water outlet 133, respectively. A sealing plate 25 is provided between the immovable ceramic plate 24 and the fixing seat 13. The movable ceramic plate 23 is slidably connected to the immovable ceramic plate 24. The bottom of the movable ceramic plate 23 is formed with a water mixing groove 231. The water mixing groove 231 movably communicates with the cold water hole 241, the hot water hole 242 and the mixed water hole 243. The connecting plate 22 is connected to the movable ceramic plate 23 to be moved synchronously. The connecting plate 22 is formed with a connecting hole 221. The rotating seat 21 is rotatable in the valve body inner cavity 10. The rotating seat 21 is formed with a mounting channel 211 passing through the rotating seat 21. The connecting plate 22 may be provided with a plurality of connecting blocks 222. The movable ceramic plate 23 is formed with a plurality of connecting grooves 232 for insertion of the respective connecting blocks 222. Through the cooperation of the connecting blocks 222 and the connecting grooves 232, the connecting plate 22 and the movable ceramic plate 23 are moved synchronously.

As shown in FIG. 1, FIG. 3 and FIG. 4, in the first embodiment of the present invention, the rocker arm 3 passes through the mounting channel 211 of the rotating seat 21. The upper end of the rocker arm 3 extends out of the valve body 1 through the through hole 11 of the valve body 1. The lower end of the rocker arm 3 is inserted into the connecting hole 221 of the connecting plate 22 so that the rocker arm 3 can drive the connecting plate 22 and the moving ceramic plate 23 to move. The middle section of the rocker arm 3 is hingedly connected to the rotating seat 21 through a pin 31. The mounting channel 211 of the rotating seat 21 is configured to confine the rocker arm 3 to be pulled between the open position and the closed position. A valve body limiting block 101 is provided in the valve body inner cavity 10 of the valve body 1. Two rotation limiting blocks 212 are provided on the side wall of the rotating seat 21 of the valve core assembly 2. The two rotation limiting blocks 212 movably contact with the two sides of the valve body limiting block 101 to confine the rocker arm 3 to rotate between the cold water position and the hot water position.

As shown in FIG. 3 and FIG. 4, in the first embodiment of the present invention, when the rocker arm 3 is moved between the open position and the closed position, the rocker arm 3 drives the movable ceramic plate 23 to move through the connecting plate 22 to control the water mixing groove 231 of the movable ceramic plate 23 to communicate with the cold water hole 241 or the hot water hole 242 of the immovable ceramic plate 24, so as to control the switching state of the inductive switching valve of the present invention. When the rocker arm 3 is moved to the open position, the water mixing groove 231 of the movable ceramic plate 23 communicates with at least one of the cold water hole 241 and the hot water hole 242 of the immovable ceramic plate 24, and the water mixing groove 231 communicates with the mixed water hole 243 of the immovable ceramic plate 24. At this time, the inductive switching valve of the present invention is in an open state. When the rocker arm 3 is moved to the closed position, the water mixing groove 231 of the movable ceramic plate 23 does not communicate with the cold water hole 241 and the hot water hole 242 of the immovable ceramic plate 24. At this time, the inductive switching valve of the present invention is in a closed state. When the rocker arm 3 is moved to the open position, if the rocker arm 3 is rotated between the cold water position and the hot water position, the rocker arm 3 drives the movable ceramic plate 23 to rotate through the connecting plate 22, so as to control the communication area between the water mixing groove 231 of the movable ceramic plate 23 and the cold water hole 241 and the hot water hole 242 of the immovable ceramic plate 24, thereby controlling the output water temperature of the inductive switching valve of the present invention.

As shown in FIG. 1, FIG. 3 and FIG. 4, in the first embodiment of the present invention, the magnetic assembly 41 and the magnetic sensor 42 of the switching feedback unit 4 are mounted to the rocker arm 3 and the valve body 1, respectively. Specifically, as shown in FIG. 1, FIG. 3 and FIG. 4, in the first embodiment of the present invention, the magnetic assembly 41 includes a magnetic post holder 412 and at least three magnetic posts 411 fitted to the magnetic post holder 412. The magnetic post holder 412 is fixed to the rocker arm 3. The magnetic posts 411 are arranged in an arc on the magnetic post holder 412. The magnetic posts 411 surround the rocker arm 3. The magnetic post holder 412 may be integrally formed with the rocker arm 3. The magnetic posts 411 are arranged in an arc on the magnetic post holder 412, and the magnetic posts 411 surround the rocker arm 3. In this way, the area of the magnetic assembly 41 that can be sensed by the magnetic sensor 42 is large, thereby avoiding the induction dead angle. As shown in FIG. 1, FIG. 3 and FIG. 4, in a second embodiment of the present invention, the valve body 1 is formed with a mounting groove 14. The magnetic sensor 42 is detachably fitted into the mounting groove 14, such that the magnetic sensor 42 can be disassembled and repaired.

Embodiment 2

Figure 5:
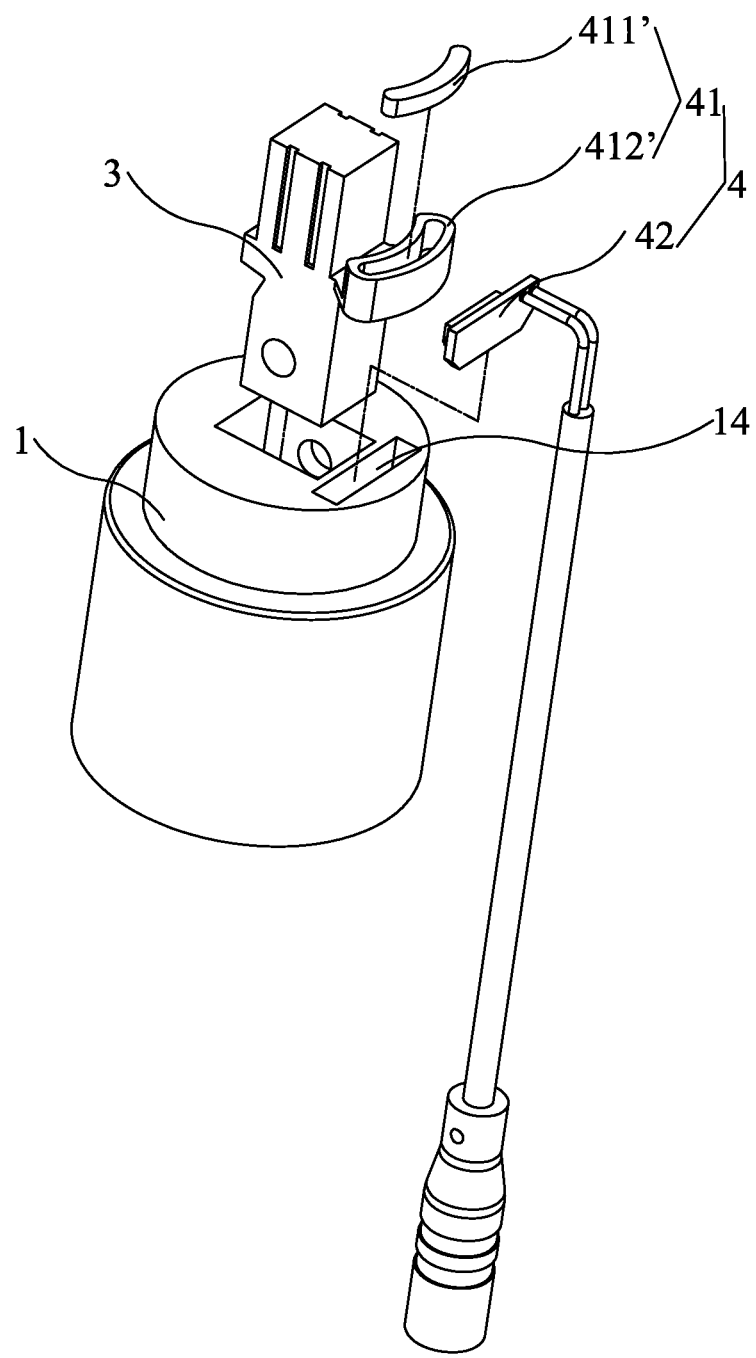
FIG. 5 is an exploded view according to a second embodiment of the present invention.

As shown in FIG. 5, the difference between the second embodiment and the first embodiment of the present invention is the switch feedback component 4. Specifically, in the second embodiment of the present invention, the magnetic assembly 41 includes a magnetic block holder 412' and an arc-shaped magnetic block 411' fitted onto the magnetic block holder 412'. The magnetic block holder 412' is fixed to the rocker arm 3, and the arc-shaped magnetic block 411' surrounds the rocker arm 3. The magnetic sensor 42 is mounted to the valve body 1. The valve body 1 may be formed with a mounting groove 14. The magnetic sensor 42 is detachably fitted into the mounting groove 14. The magnetic block holder 412' may be integrally formed with the rocker arm 3. In the second embodiment of the present invention, the arc-shaped magnetic block 411' surround the rocker arm 3, so that the area of the magnetic assembly 41 that can be sensed by the magnetic sensor 42 is large, thereby avoiding the induction dead angle.

Embodiment 3

Figure 6:
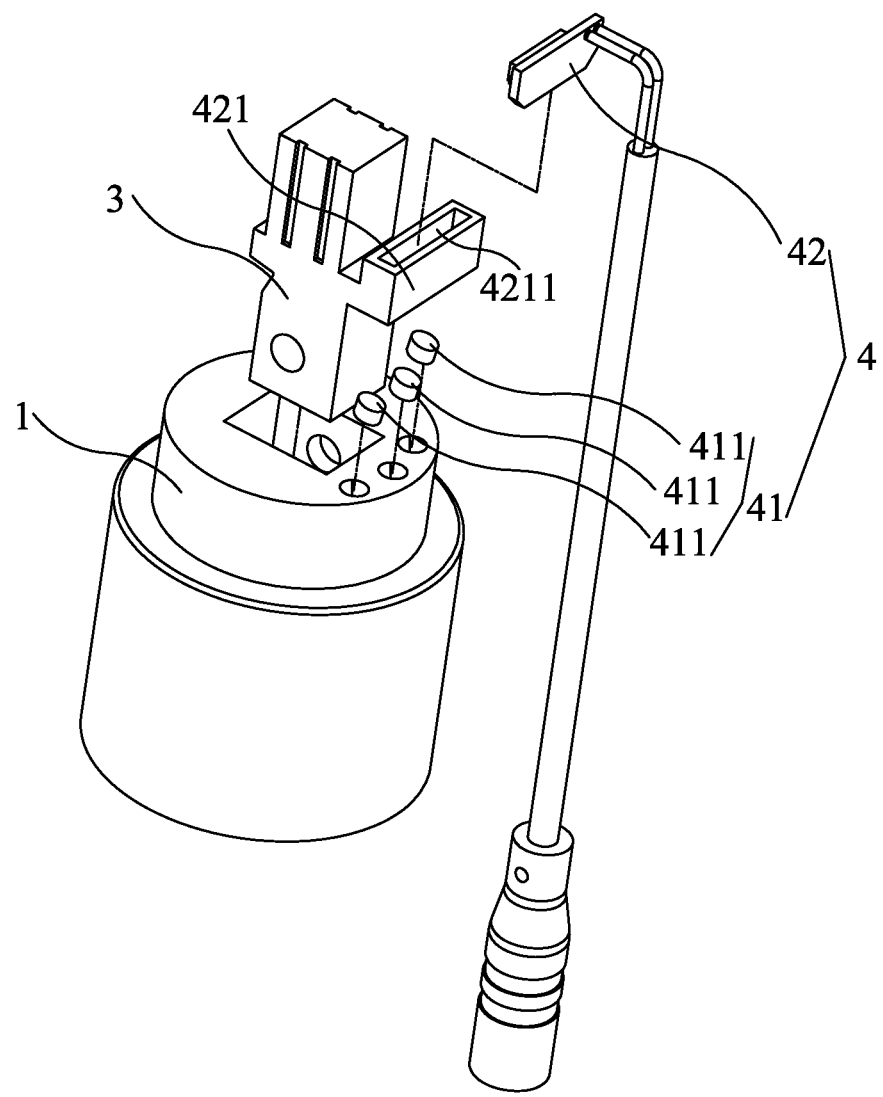
FIG. 6 is an exploded view according to a third embodiment of the present invention.

As shown in FIG. 6, the difference between the third embodiment and the first embodiment of the present invention is the switch feedback component 4. Specifically, in the third embodiment of the present invention, the magnetic assembly 41 includes at least three magnetic posts 411. The magnetic posts 411 are arranged in an arc and fitted onto the top of the valve body 1, and the magnetic posts 411 surround the center of the top of the valve body 1. The rocker arm 3 passes through the center of the top of the valve body 1, and the magnetic sensor 42 is mounted to the rocker arm 3. The magnetic posts 411 are disposed on the top of the valve body 1 by plastic coating, or the magnetic posts 411 are connected to the top of the valve body 1 by bonding, or the magnetic posts 411 are directly embedded in the top of the valve body 1. The magnetic sensor 42 is connected to the rocker arm 3 through a magnetic sensor holder 421. The magnetic sensor holder 421 is connected to the rocker arm 3, and the magnetic sensor holder 421 is formed with an engaging groove 4211. The magnetic sensor 42 is detachably fitted into the engaging groove 4211, such that the magnetic sensor 42 can be removed for maintenance. The magnetic sensor holder 421 may be integrally formed with the rocker arm 3. In the third embodiment of the present invention, the magnetic posts 411 surround the center of the top of the valve body 1, and the rocker arm 3 passes through the center of the top of the valve body 1, so that the area of the magnetic assembly 41 that can be sensed by the magnetic sensor 42 is large, thereby avoiding the induction dead angle.

Embodiment 4

Figure 7:
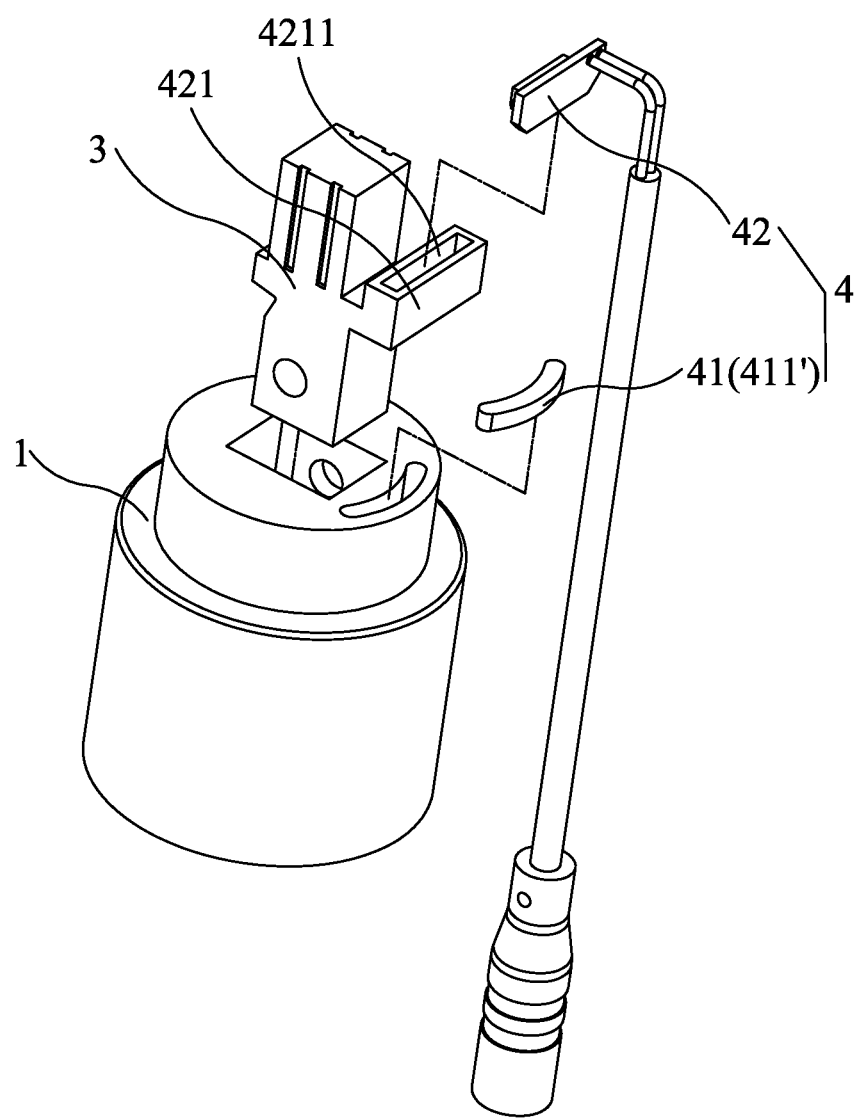
FIG. 7 is an exploded view according to a fourth embodiment of the present invention.

As shown in FIG. 7, the difference between the fourth embodiment and the first embodiment of the present invention is the switch feedback component 4. Specifically, in the fourth embodiment of the present invention, the magnetic assembly 41 includes an arc-shaped magnetic block 411'. The arc-shaped magnetic block 411' is fitted onto the top of the valve body 1, and the arc-shaped magnetic block 411' surrounds the center of the top of the valve body 1. The rocker arm 3 passes through the center of the top of the valve body 1. The magnetic sensor 42 is mounted to the rocker arm 3. The arc-shaped magnetic block 411' is disposed on the top of the valve body 1 by plastic coating, or the arc-shaped magnetic block 411' is connected to the top of the valve body 1 by bonding, or the arc-shaped magnetic block 411' is directly embedded in the top of the valve body 1. The magnetic sensor 42 is connected to the rocker arm 3 through a magnetic sensor holder 421. The magnetic sensor holder 421 is connected to the rocker arm 3, and the magnetic sensor holder 421 is formed with an engaging groove 4211. The magnetic sensor 42 is detachably fitted into the engaging groove 4211, such that the magnetic sensor 42 can be removed for maintenance. The magnetic sensor holder 421 may be integrally formed with the rocker arm 3. In the fourth embodiment of the present invention, the arc-shaped magnetic block 411' surrounds the center of the top of the valve body 1, and the rocker arm 3 passes through the center of the top of the valve body 1, so that the area of the magnetic assembly 41 that can be sensed by the magnetic sensor 42 is large, thereby avoiding the induction dead angle.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An inductive switching valve, comprising a valve body, a valve core assembly, a rocker arm, and a switching feedback unit;
   the valve core assembly being mounted in the valve body; the rocker arm being movably connected to the valve body, the rocker arm being matched with the valve core assembly, the rocker arm being movable between an open position and a closed position so that the valve core assembly controls the inductive switching valve to switch a switching state, the rocker arm being rotatable between a cold water position and a hot water position for the valve core assembly to control an output water temperature of the inductive switching valve;
   the switching feedback unit including a magnetic assembly with magnetism and a magnetic sensor for sensing a magnetic field of the magnetic assembly, one of the magnetic assembly and the magnetic sensor being mounted to the valve body, the other of the magnetic assembly and the magnetic sensor being mounted to the rocker arm.

2. The inductive switching valve as claimed in claim 1, wherein the magnetic assembly includes a magnetic post holder and at least three magnetic posts fitted to the magnetic post holder, the magnetic post holder is fixed to the rocker arm, the magnetic posts are arranged in an arc on the magnetic post holder, the magnetic posts surround the rocker arm; and the magnetic sensor is mounted to the valve body.

3. The inductive switching valve as claimed in claim 2, wherein the valve body is formed with a mounting groove, and the magnetic sensor is detachably fitted into the mounting groove.

4. The inductive switching valve as claimed in claim 1, wherein the magnetic assembly includes a magnetic block holder and an arc-shaped magnetic block fitted onto the magnetic block holder; the magnetic block holder is fixed to the rocker arm, the arc-shaped magnetic block surrounds the rocker arm; and the magnetic sensor is mounted to the valve body.

5. The inductive switching valve as claimed in claim 4, wherein the valve body is formed with a mounting groove, and the magnetic sensor is detachably fitted into the mounting groove.

6. The inductive switching valve as claimed in claim 1, wherein the magnetic assembly includes at least three magnetic posts, the magnetic posts are arranged in an arc and fitted onto a top of the valve body, the magnetic posts surround a center of the top of the valve body; the rocker arm passes through the center of the top of the valve body, and the magnetic sensor is mounted to the rocker arm.

7. The inductive switching valve as claimed in claim 6, wherein the magnetic sensor is connected to the rocker arm through a magnetic sensor holder, the magnetic sensor holder is connected to the rocker arm, the magnetic sensor holder is formed with an engaging groove, and the magnetic sensor is detachably fitted into the engaging groove.

8. The inductive switching valve as claimed in claim 1, wherein the magnetic assembly includes an arc-shaped magnetic block, the arc-shaped magnetic block is fitted onto a top of the valve body, the arc-shaped magnetic block surrounds a center of the top of the valve body; the rocker arm passes through the center of the top of the valve body, and the magnetic sensor is mounted to the rocker arm.

9. The inductive switching valve as claimed in claim 8, wherein the magnetic sensor is connected to the rocker arm through a magnetic sensor holder, the magnetic sensor holder is connected to the rocker arm, the magnetic sensor holder is formed with an engaging groove, and the magnetic sensor is detachably fitted into the engaging groove.

10. The inductive switching valve as claimed in claim 1, wherein a top and a bottom of the valve body are formed with a through hole and a mounting hole to communicate with a valve body inner cavity, respectively; the mounting hole at the bottom of the valve body is fitted with a fixing seat, the fixing seat is formed with a cold water inlet, a hot water inlet and a mixed water outlet;
   the valve core assembly includes a rotating seat, a connecting plate, a movable ceramic plate and an immovable ceramic plate that are sequentially arranged in the valve body inner cavity in a top-down direction, the immovable ceramic plate is formed with a cold water hole, a hot water hole and a mixed water hole that are in communication with the cold water inlet, the hot water inlet and the mixed water outlet, respectively; the movable ceramic plate is slidably connected to the immovable ceramic plate, a bottom of the movable ceramic plate is formed with a water mixing groove, the water mixing groove movably communicates with the cold water hole, the hot water hole and the mixed water hole; the connecting plate is connected to the movable ceramic plate to be moved synchronously, the connecting plate is formed with a connecting hole; the rotating seat is rotatable in the valve body inner cavity, the rotating seat is formed with a mounting channel passing through the rotating seat;
   the rocker arm passes through the mounting channel, an upper end of the rocker arm extends out of the valve body through the through hole, a lower end of the rocker arm is inserted into the connecting hole of the connecting plate, and a middle section of the rocker arm is hingedly connected to the rotating seat through a pin.

11. The inductive switching valve as claimed in claim 10, wherein a valve body limiting block is provided in the valve body inner cavity of the valve body, two rotation limiting blocks are provided on a side wall of the rotating seat of the valve core assembly, and the two rotation limiting blocks movably contact with two sides of the valve body limiting block.

12. The inductive switching valve as claimed in claim 1, wherein the magnetic sensor is one of a Hall switch and a reed switch.

\* \* \* \* \*